Oct. 21, 1969  B. BARENYI ET AL  3,473,821
AXLE ARRANGEMENT FOR AUTOMOTIVE VEHICLES
Filed Sept. 8, 1966

INVENTORS
BELA BARENYI
KARL WILFERT

BY *Dicke + Craig*
ATTORNEYS

United States Patent Office 3,473,821
Patented Oct. 21, 1969

3,473,821
AXLE ARRANGEMENT FOR AUTOMOTIVE
VEHICLES
Bela Barenyi, Stuttgart-Vaihingen, and Karl Wilfert, Gerlingen-Waldstadt, Germany, assignors to Daimler-Benz Aktiengesellschaft, Stuttgart-Unterturkheim, Germany
Filed Sept. 8, 1966, Ser. No. 578,051
Int. Cl. B60g 7/02, 11/50; B62d 21/00
U.S. Cl. 280—124                                10 Claims

ABSTRACT OF THE DISCLOSURE

A spring suspension for the driven wheels of a motor vehicle wherein each wheel is provided with a longitudinally extending guide arm and a spring support with respect to the vehicle superstructure, wherein the guide arms are resiliently interconnected for pivotal relative movement about a transverse axis by a torsion coupling carried within a supporting element that is mounted for pivotal movement about a longitudinal axis. The supporting element also carries the axle gear box drivingly connected with the engine by means of a drive shaft coextensioned wtih the longitudinal axis.

Background of the invention

The invention relates to an axle arrangement for automotive vehicles wherein the mutually facing wheels of a wheel pair are mounted on a supporting element pivotable with respect to the upper structure of the vehicle about a longitudinal axis of the vehicle, so that these wheels can swing about an axis which is offset with respect to the wheel axle and extends approximately at right angles to the driving direction. Such an axle arrangement makes it possible to universally (Cardanically) adjust the wheels on all sides to the unevennesses of the ground.

In the previously known arrangements of this type such as disclosed in German Patents Nos. 888,217, 893,757, 895,254, the wheels of a wheel pair are suspended on a rigid axle bent toward the front in the driving direction, which rigid axle is supported in a transverse sleeve of the pivotable supporting element and is cushioned against this supporting element. However, in many cases, such a connection of the two wheel supports by means of a rigid axle extending all the way through the sleeve of the supporting element is not sufficient to provide the necessary flexibility of movement of the individual wheels in spite of the Cardanic suspension, since the wheels can only execute motions wherein the wheel center axles move together to maintain their position with respect to each other, i.e., particularly their aligned position, without effecting any relative changes.

SUMMARY OF THE INVENTION

The object of the invention is to provide a wheel mounting permitting a suspension which adapts itself especially well to the unevennesses of the road, wherein at the same time the wheel track is accurately maintained and the planes of rotation of the wheels retain their parallel position with respect to the longitudinal swing axis of the axle assembly.

According to the invention, there is thus provided an axle arrangement wherein the wheels are swingably mounted separately from one another on the pivotable supporting element, so that they swing about their respective transverse axes, which are offset with respect to the wheel axle, but wherein the wheels are coupled to one another, in the direction of rotation, in a torsion-elastic manner permitting relative rotational movement therebetween.

For coupling between the wheels of a pair, there can be provided, in this connection, in one embodiment of the invention, torsion springs, for example, torsion rods, torsion couplings, or the like. Thereby, the wheels can swing out independently of one another, especially in case of minor roughnesses of the road and small vibrations, but wherein the axle assembly is at the same time capable of yielding additionally in this case.

BRIEF DESCRIPTION OF THE DRAWING

These and other objects, features and advantages of the present invention will become more apparent from the following detailed description of the invention when taken with the accompanying drawings which disclose two exemplary embodiments of the invention, and wherein.

DETAILED DESCRIPTION OF THE DRAWING

Figure 1:
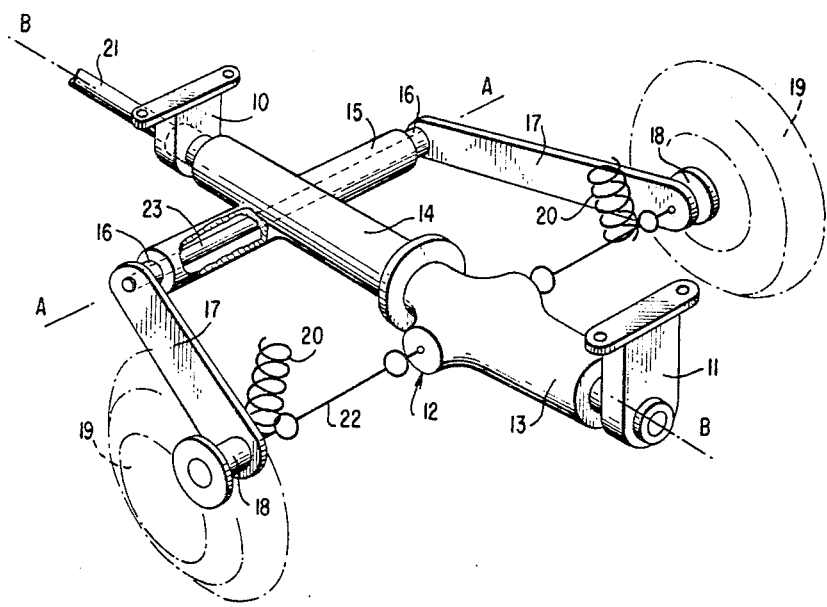
FIGURE 1 is a perspective view of a first embodiment of the invention.

Referring now specifically to the drawings, wherein like reference numerals are used wherever possible to designate like elements, and particularly to FIGURE 1, elements 10 and 11 designate two bearing blocks, in connection with a rear axle suspension, which bearing blocks are attached to the upper structure such as to body or frame of a self supporting type body construction of the vehicle (not shown). The supporting element 12 is mounted in these bearing blocks to be pivotable about a pivot axis B—B extending in the longitudinal direction of the vehicle. The supporting element 12 comprises the axle gearbox 13, as well as a front housing pipe 14.

A crosspiece 15 is securely connected, for example in a somewhat offset manner, with the front housing pipe 14, for example by welding. By means of suitable journal pins 16, the guide arms 17 are mounted in the ends of the crosspiece 15, to be pivotable about the transverse axis A—A. The guide arms 17 carry, at their ends, the wheel supports 18 for the wheels 19 and are cushioned with respect to the upper structure of the vehicle by means of helical springs 20, in the form of conventional coiled car springs.

The wheels are driven by a drive shaft 21; powered, for example, by an engine (not shown) provided in the front of the vehicle, which drive shaft 21, in turn, drives the wheels 19 by means of the double-joint shafts 22, via the axle gearing in the axle gearbox 13.

The journal pins 16 of the guide arms 17 are furthermore connected wtih each other, in the embodiment of FIGURE 1, by a torsion rod 23 provided within the crosspiece 15 and extending along the axis A—A.

If both wheels 19 are lifted at the same time, only the supporting springs 20 become effective. However, if the wheels 19, or the guide arms 17, execute rising motions directed oppositely to each other, the entire axle system, consisting particularly of the supporting element 12 with the crosspiece 15, together with the wheels 19 and the guide arms 17, can pivot or rotate about the longitudinal pivot axis B—B. The rotation of the supporting element 12, however, will only occur by a partial angle, since the springs 20 also respond at this time—by applying a load on one side of the vehicle and relieving the load on the other side of the vehicle—as well as the rod 23 due to the relative movement of the wheels; the resilient power of one or the other of the springs can be smaller or larger, depending upon the balancing of the springs with respect to one another.

Figure 2:
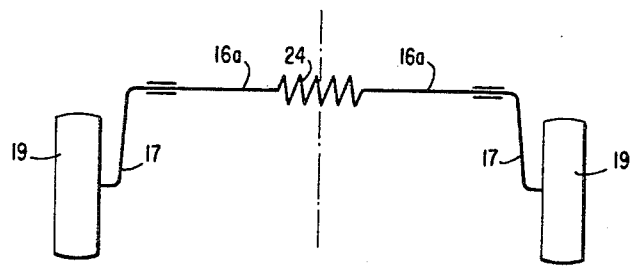
FIGURE 2 is a schematic plan view of a further embodiment of the invention.

The embodiment of FIGURE 2 differs from that of FIGURE 1 only in that, in place of a torsion rod 23, a helical spring 24 is provided which is under torsional load and connects the journal pins 16a of the guide arms 17 with each other. In place of the spring 24, it is also possible to provide any other conventional torsion coupling. Otherwise, the arrangement of FIGURE 2 can be identical with that of FIGURE 1. For the sake of clarity, the individual parts not directly connected with the invention have been omitted from FIGURE 2.

While we have shown and described two embodiments in accordance with the present invention, it is understood that the same is not limited thereto but is susceptible of numerous changes and modifications as known to a person skilled in the art. For example, the axle assembly of the present invention can, if desired, be resiliently suspended at the upper structure of the vehicle in the direction at right angles to the direction of the vehicle. We, therefore, do not wish to be limited to the details shown and described herein but intend to cover all such changes and modifications.

If desired, the axle assembly can also be resiliently suspended at the upper structure of the direction at right angles to the direction of the vehicle, for example, in correspondence with German Patent No. 888,217.

We claim:

1. An axle arrangement for automotive vehicles having a vehicle superstructure comprising a pair of mutually facing wheels having a coextensive axis of rotation in the static condition, supporting means for said pair of wheels mounted on said vehicle superstructure for pivotable rotation about a vehicle longitudinal axis, said supporting means including a pair of separate guide arm means mounting respective ones of said pair of wheels for rotation about a transverse vehicle axis offset from said wheel axis, first spring means at the wheel mounting ends of each of said guide arm means resisting deflection of said wheels, and second spring means resiliently interconnecting the opposite ends of each of said guide arm means for substantial relative rotation about said transverse vehicle axis.

2. The combination defined in claim 1, wherein said guide arm means include first and second generally longitudinally extending guide arms connected to respective ones of said wheels, and torsion coupling means interconnecting said guide arms longitudinally spaced from the connection with said wheels for permitting resilient relative pivoting movement therebetween.

3. The combination defined in claim 2, wherein said torsion coupling means is in the form of a torsion rod.

4. The combination defined in claim 2, wherein said torsion coupling means is in the form of a pre-stressed torsion helical spring.

5. The combination defined in claim 1, wherein said supporting means further includes a longitudinal supporting element mounted for rotation about said longitudinal vehicle axis, said guide arm means being securely mounted on said supporting element.

6. The combination defined in claim 1, wherein said guide arms are interconnected by a torsion coupling element.

7. The combination defined in claim 6, wherein said torsion coupling element is in the form of a torsion rod.

8. The combination defined in claim 6, wherein said torsion coupling element is in the form of prestressed torsion spring.

9. The combination defined in claim 1, wherein said first spring means includes first and second coil springs.

10. The combination defined in claim 2, wherein said guide arms extend rearwardly from said coupling means to their respective wheels with respect to the driving direction, first spring means includes separate springs mounted between said vehicle superstructure and each of said guide arms closely adjacent to the respective wheels, said supporting means includes a longitudinally extending housing pivotably mounted at its opposite ends to said vehicle superstructure and a transversely extending crosspiece rigidly mounted to said housing and carrying therein said torsion coupling means, said supporting means includes an axle gear box, and further including a pair of double-jointed swinging half axles drivingly connected between said axle gear box and respective ones of said wheels, and a drive shaft means coaxial with said longitudinal axis operatively connected with said axle gear box.

References Cited

UNITED STATES PATENTS

| 2,043,542 | 6/1936 | Johnson | 180—73 |
| 3,165,332 | 1/1965 | Barker | 280—124.3 |
| 3,049,359 | 8/1962 | Geyer | 267—60 X |
| 2,330,541 | 9/1943 | Barenyi | 280—112 X |

PHILIP GOODMAN, Primary Examiner

U.S. Cl. X.R.

180—73; 267—57